(12) United States Patent
Yoshikawa et al.

(10) Patent No.: US 7,438,276 B2
(45) Date of Patent: Oct. 21, 2008

(54) ELECTROMAGNETIC VALVE FOR BRAKE CONTROL

(75) Inventors: Atsushi Yoshikawa, Kariya (JP); Yozo Majima, Kariya (JP)

(73) Assignee: Advics Co., Ltd., Aichi-pref. (JP)

(*) Notice: Subject to any disclaimer, the term of this patent is extended or adjusted under 35 U.S.C. 154(b) by 127 days.

(21) Appl. No.: 11/505,384

(22) Filed: Aug. 17, 2006

(65) Prior Publication Data

US 2007/0045581 A1 Mar. 1, 2007

(30) Foreign Application Priority Data

Aug. 26, 2005 (JP) ............................. 2005-245418

(51) Int. Cl.
*F16K 31/02* (2006.01)
(52) U.S. Cl. ............................. 251/129.08; 251/129.15; 303/119.1
(58) Field of Classification Search ............ 251/129.08, 251/129.15; 303/119.1, 119.2, 119.3
See application file for complete search history.

(56) References Cited

U.S. PATENT DOCUMENTS

| | | |
|---|---|---|
| 6,092,781 A | 7/2000 | Hohl et al. |
| 6,113,066 A * | 9/2000 | Hohl et al. ............. 251/129.02 |
| 6,705,589 B2 * | 3/2004 | Hofmann et al. ........ 251/129.15 |

FOREIGN PATENT DOCUMENTS

JP A-55-063809 5/1980

* cited by examiner

*Primary Examiner*—John K Fristoe, Jr.
(74) *Attorney, Agent, or Firm*—Posz Law Group, PLC

(57) ABSTRACT

In a pressure increase control valve, the size of a gap G between a plunger and a guide is 0.2 mm or greater, or a ratio between a diameter of a restriction and a seat diameter ds is 0.9 or less. Setting the size of the gap between the plunger and the guide to 0.2 mm or greater can decrease variations in an electromagnetic force with respect to a stroke of a valve body. In addition, setting the ratio between the diameter do of the restriction and the seat diameter to 0.9 or less can increase variations in a fluid force with respect to the stroke of the valve body. Therefore, it is easier to achieve a relationship between the electromagnetic force and a resistance force that is required in order to enable linear control of a differential pressure amount generated between upstream and downstream flows.

5 Claims, 8 Drawing Sheets

ELECTROMAGNETIC VALVE FOR BRAKE CONTROL

CROSS REFERENCE TO RELATED APPLICATION

This application is based upon and claims the benefit of Japanese Patent Application No. 2005-245418 filed on Aug. 26, 2005, the content of which are incorporated herein by reference.

FIELD OF THE INVENTION

The present invention relates to an electromagnetic valve provided in an actuator for hydraulic pressure control in a brake apparatus. In particular, the present invention relates to an electromagnetic valve for brake control, which is capable of linear control of a differential pressure amount that is generated between upstream and downstream flows thereof.

BACKGROUND OF THE INVENTION

Electromagnetic valves provided in actuators for hydraulic pressure control in brake apparatus have been typically designed such that a differential pressure amount generated between upstream and downstream flows of the electromagnetic valve is varied. One method involves ON/OFF duty control of an electric current flowing to a solenoid of the electromagnetic valve, which achieves a differential pressure amount in accordance with a duty ratio.

Under such duty control, however, operation noise may be generated due to pulsation of a brake fluid pressure. Therefore, a new method was tried to enable linear control of the differential pressure amount generated between the upstream and downstream flows of the electromagnetic valve, in accordance with an electromagnetic force that is applied to the electromagnetic valve.

In order to enable linear control of the differential pressure amount generated between the upstream and downstream flows of the electromagnetic valve, the relationship described below must be achieved between an electromagnetic force for attracting a plunger, and the sum of a fluid force acting on a valve body as a force resisting the electromagnetic force (hereinafter referred to as a "resistance force") and a spring force of a spring for biasing the plunger (with such sum hereinafter referred to as "fluid force+spring force" (or as a "resistance force")).

FIG. 9 is a characteristic diagram illustrating the relationship between the electromagnetic force and fluid force+spring force. FIGS. 10A to 10C are pattern diagrams illustrating actions of the valve body in order to explain the relationship in FIG. 9.

As FIG. 10A shows, the electromagnetic force and fluid force+spring force are equal when the valve body is assumed to be at a predetermined balanced distance from a valve seat. A linear-controlled valve generating a differential pressure force in accordance with the electromagnetic force must be designed such that the valve body returns to the original balanced position. That is, the valve body must return to the original balanced position regardless of imbalances between the electromagnetic force and fluid force+spring force, which may be caused by any external disturbances, such as fluctuations in the fluid force or vehicle vibration.

Therefore, defining a balance point where the electromagnetic force and fluid force+spring force are equal as shown in FIG. 9 as a reference position, the electromagnetic force must be greater than fluid force+spring force so as to draw the valve body back toward the valve seat side when the valve body moves in a direction away from the valve seat (in a direction that opens the valve). Alternatively, fluid force+spring force must be greater than the electromagnetic force so as to draw the valve body away from the valve seat when the valve body moves in a direction approaching the valve seat (in a direction that closes the valve). In other words, the force relationships illustrated by arrows in FIGS. 10B and 10C must be achieved.

In order to achieve such relationships, an electromagnetic valve described in Published Japanese Patent Application No. SHO-61-41123 has an end face, that is, an attraction face, on a guide forming a core that is machined into a concave shape. Magnetism can thus escape over a broad area when an end of a plunger forming a movable core approaches the attraction face. As a result, changes in an attraction force with respect to a valve body stroke (an attraction force gradient) becomes gentler than a gradient of fluid force+spring force, thus attaining the above relationships.

An electromagnetic valve described in a Japanese translation of PCT International Application No. 2000-512585 has a hemispheric shape achieved by forming an end of the cylindrical valve body provided on an end of the plunger into a spherical shape. This in turn increases a fluid force gradient, thus attaining the above relationships.

In the electromagnetic valve described in Published Japanese Patent Application No. SHO-61-41123, however, complicated machining is required in order to achieve the concave-shaped attraction face of the guide forming the core. Furthermore, complicated machining is also required in order to achieve the spherical-shaped end of the cylindrical valve body, which is provided on the end of the plunger in the electromagnetic valve described in the Japanese translation of PCT International Application No. 2000-512585. Therefore, the problem of complicated machining in order to attain the above relationships arises with regards to the electromagnetic valves in both Published Japanese Patent Application No. SHO-61-41123 and the Japanese translation of PCT International Application No. 2000-512585.

SUMMARY OF THE INVENTION

It is an object of the present invention to provide an electromagnetic valve with a structure that does not require complicated machining in order to enable linear control of a differential pressure amount generated between upstream and downstream flows of the electromagnetic valve.

According to a first aspect of the present invention, a linear-controlled electromagnetic valve for brake control is provided with a plunger, which is accommodated within a cup-shaped sleeve, for slidably operating within the sleeve by energization of a coil; and a shaft having a spherical valve body, for moving in accordance with the sliding of the plunger. Also provided is a guide with a guide hole, which hold the shaft and keeps its sliding, and an attraction face of the guide is inserted in the sleeve. Further provided is a seat portion including a valve seat, which the valve body comes in contact with and separates from, and a communicative passage that opens and closes based on the contact and separation of the valve body with respect to the valve seat. In such a construction, an attraction force in accordance with the energization current to the plunger makes the valve body come in contact with the valve seat. A resistance force in the opposite direction of the attraction force to the shaft makes the valve body separate the valve seat. By the attraction force and the resistance force, the valve body moves over a range where a stroke of the valve body from the valve seat is zero up to a maximum value. Further, a gap of 0.2 mm or greater is left between the end face of the plunger and the attraction face of the guide when the valve body comes in contact with the valve seat. Over a range where a stroke of the valve body from the valve seat is zero up to a maximum value, a stroke-attraction force characteristic line, which rises in accordance with a rise of electromagnetic force quantity, has a gentler gradient than a stroke-resistance force characteristic line and moves up and down in accordance with an electromagnetic force applied. Furthermore, an attraction force at maximum value of the stroke in the stroke-attraction force characteristic line at a minimum value of electromagnetic force is smaller than a resistance force minimum point of the stroke-resistance force characteristic line, an attraction force at 0 value of the stroke in the stroke-attraction force characteristic line at a maximum value of electromagnetic force is greater than a resistance force maximum point of the stroke-resistance force characteristic line.

As described above, setting the gap between the end face of the plunger and the attraction face of the guide to 0.2 mm or greater makes it possible to decrease variations in the electromagnetic force that slides the plunger during energization of the coil.

Therefore, over a range where a stroke of the valve body from the valve seat is zero up to a maximum value, a stroke-attraction force characteristic line has a gentler gradient than a stroke-resistance force characteristic line and moves up and down in accordance with an electromagnetic force applied. Furthermore, an attraction force at maximum value of the stroke in the stroke-attraction force characteristic line at a minimum value of electromagnetic force is smaller than a resistance force minimum point of the stroke-resistance force characteristic line, and an attraction force at zero value of the stroke in the stroke-attraction force characteristic line at a maximum value of electromagnetic force is greater than a resistance force maximum point of the stroke-resistance force characteristic line. This can help simplify the construction of an electromagnetic valve capable of linear control of the differential pressure amount generated between the upstream and downstream flows.

Accordingly, the valve body is formed into a sphere, which is an extremely easy shape to manufacture. The attraction face of the guide is also formed flat without concave portion that are difficult to machine. Furthermore, linear control of the differential pressure amount generated between the upstream and downstream flows of the electromagnetic valve can be achieved. Therefore, an electromagnetic valve with a structure that does not require complicated machining for linear control of a differential pressure amount generated between upstream and downstream flows can be achieved.

According to a second aspect of the present invention, the communicative passage of the seat is formed with a restriction whose passage cross-sectional area is smaller than other portions of the communicative passage. A circular diameter, which is formed by a contact portion between the valve body and the valve seat when the valve body comes in contact with the valve seat, is a seat diameter. Also, a ratio between a diameter of the restriction and the seat diameter is 0.9 or less.

As described above, setting the ratio between the diameter of the restriction and the seat diameter to 0.9 or less makes it possible to increase variations in a fluid force with respect to the stroke of the valve body.

Therefore, over a range where a stroke of the valve body from the valve seat is zero up to a maximum value, a stroke-attraction force characteristic line has a gentler gradient than a stroke-resistance force characteristic line and moves up and down in accordance with an electromagnetic force applied. Furthermore, an attraction force at maximum value of the stroke in the stroke-attraction force characteristic line at a minimum value of electromagnetic force is smaller than a resistance force minimum point of the stroke-resistance force characteristic line, and an attraction force at zero value of the stroke in the stroke-attraction force characteristic line at a maximum value of electromagnetic force is greater than a resistance force maximum point of the stroke-resistance force characteristic line. This can help simplify the construction of an electromagnetic valve capable of linear control of the differential pressure amount generated between the upstream and downstream flows.

Accordingly, the valve body is formed into a sphere, which is an extremely easy shape to manufacture. The attraction face of the guide is also formed flat without concave portion that are difficult to machine. Furthermore, linear control of the differential pressure amount generated between the upstream and downstream flows of the electromagnetic valve can be achieved. Therefore, an electromagnetic valve with a structure that does not require complicated machining for linear control of a differential pressure amount generated between upstream and downstream flows can be achieved.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
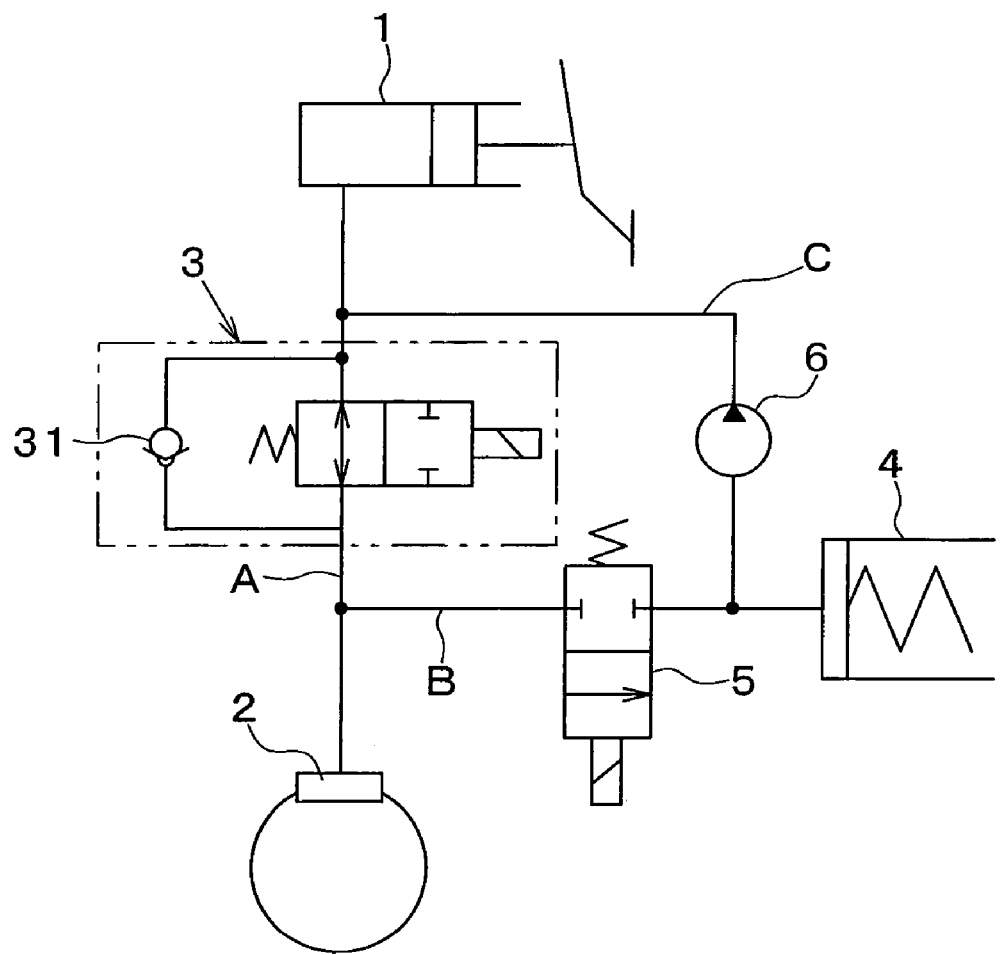
FIG. 1 is a block diagram showing a block structure of a brake apparatus that is provided with an electromagnetic valve for brake control according to a first embodiment of the present invention.

The present invention will be described further with reference to various embodiments in the drawings.

First Embodiment

FIG. 1 shows a conduit configuration of a brake apparatus provided with an electromagnetic valve for brake control according to a first embodiment of the present invention.

As shown in FIG. 1, a conduit A connects a master cylinder (hereinafter referred to as "M/C") 1 and a wheel cylinder (hereinafter referred to as "W/C") 2. Brake fluid can flow from the M/C 1 side to the W/C 2 side via the conduit A. A pressure increase control valve 3 is provided in the conduit A for controlling communicative state or differential pressure state of the conduit A. It should be noted that a check valve 31 is included in the pressure increase control valve 3, which allows only the flow of brake fluid from the W/C 2 side to the M/C 1 side. The pressure increase control valve 3 corresponds to the electromagnetic valve for brake control of the present invention, and will be described in detail later.

A conduit B, which is connected to a reservoir 4, is connected a portion of the conduit A closer to the W/C 2 side (a downstream side) than the pressure increase control valve 3. A pressure decreasing control valve 5 is provided in the conduit B for controlling open state or closed state of the conduit B. The pressure decreasing control valve 5 is operated to a closed state during normal braking, and is operated to an open state at a pressure-decreasing timing during ABS control such that brake fluid in the conduit A escapes to the reservoir 4, thereby decreasing a W/C pressure.

Furthermore, a portion of the conduit A closer to the M/C 1 side (an upstream side) than the pressure increase control valve 3 and the reservoir 4 are connected via a conduit C. A pump 6, which sucks and discharges brake fluid escaped in the reservoir 4, is provided in the conduit C so as to enable the return of brake fluid to the conduit A.

Figure 2:
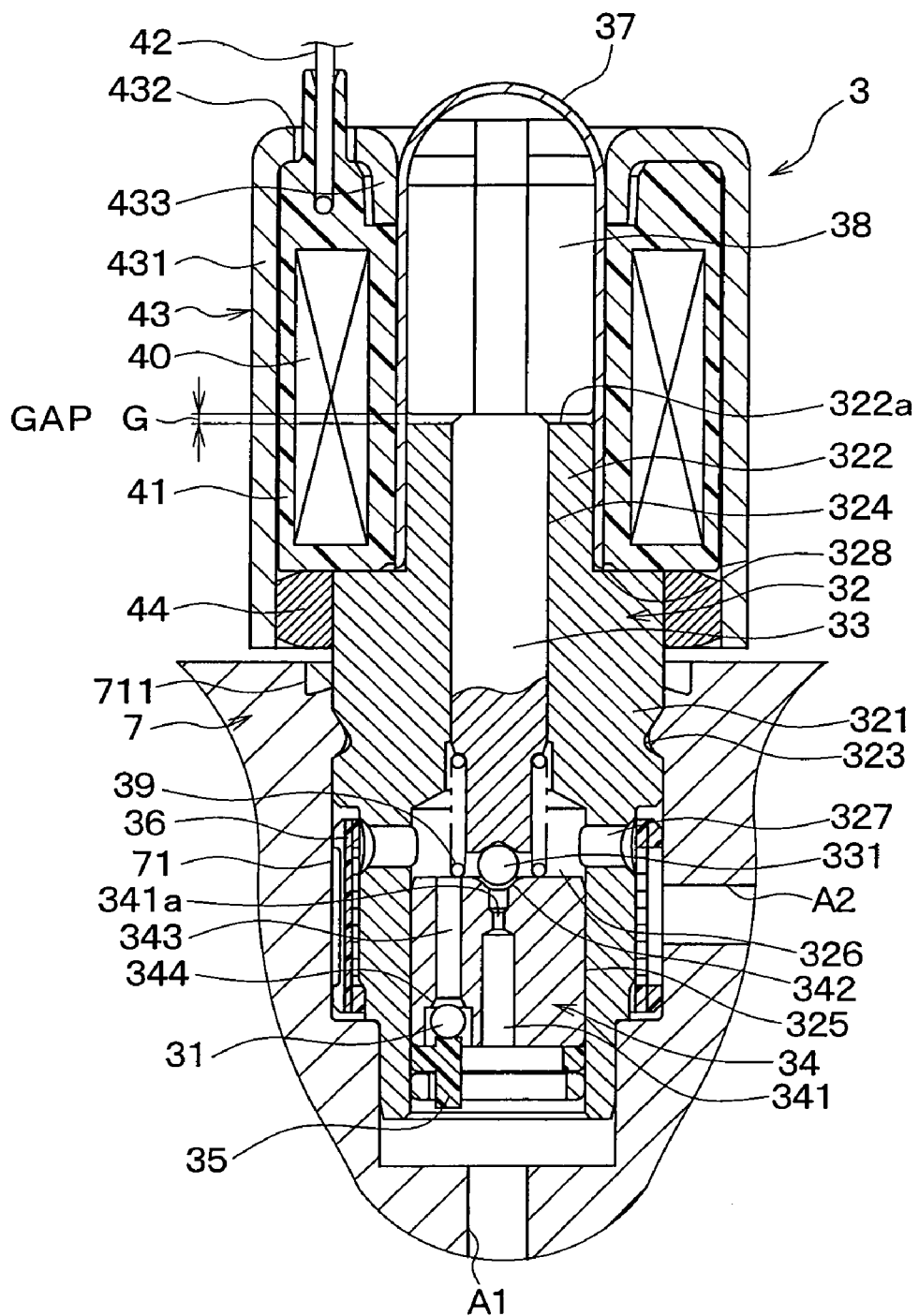
FIG. 2 is a view of a cross-sectional structure when a pressure increase control valve is disposed in a housing of an ABS actuator.

Note that, in the brake apparatus structured as described above, the reservoir 4, the pump 6, the pressure increase control valve 3, and the pressure decreasing control valve 5 are fixed to an aluminum housing 7 (see FIG. 2). Accordingly, these elements are connected to desired locations of the conduits A to C, which are formed by boring the housing 7. An ABS actuator is formed through integration of the housing and these elements. The brake apparatus shown in FIG. 1 is structured by connecting the ABS actuator, the M/C 1, and the W/C 2 via ports (not shown) that are formed in the housing 7.

FIG. 2 shows a cross-sectional structure when a pressure increase control valve 3 is disposed in a housing 7 of an ABS actuator. Based on FIG. 2, the basic structure of the pressure increase control valve 3 will be described below.

In FIG. 2, a concave portion 71 is formed in the housing 7 and used to attach to the pressure increase control valve 3. The concave portion 71 is formed so as to communicate with the conduit A provided in the housing 7. The concave portion 71 is structured such that a conduit A1 upstream of the pressure increase control valve 3 is connected to the M/C 1, and a conduit A2 downstream of the pressure increase control valve 3 is connected to the W/C 2.

The pressure increase control valve 3 is provided with a guide 32 that acts as a magnetic path member formed by a magnetic body. The guide 32 is formed in a stepped cylindrical shape, and a major diameter portion 321 side of the guide 32 is accommodated in the concave portion 71 of the housing 7. In addition, a minor diameter portion 322 and a part of the major diameter portion 321 of the guide 32 project outside the concave portion 71. An opening end portion 711 of the concave portion 71 is crimped, and a part of the housing 7 is thus inserted into a recess 323 on an outer peripheral face of the major diameter portion 321, whereby the guide 32 is fixed to the housing 7.

The guide 32 is formed with a guide hole 324, a seat insertion hole 325, and a communicative hole 327. The guide hole 324 is positioned on the minor diameter portion 322 side and slidably supports a shaft 33; the seat insertion hole 325 is positioned on the major diameter portion 321 side and is press-fit with a seat portion 34; and the communicative hole 327 puts a space 326 surrounded by the seat portion 34 and the seat insertion hole 325 in communication with the conduit A2.

The shaft 33 is cylindrical and formed from a nonmagnetic metal (e.g. stainless steel). An end portion of the shaft 33 on the seat portion 34 side projects from the guide hole 324 of the guide 32 and extends toward the space 326. A spherical valve body 331 is welded to a tip of the end portion. The diameter of the valve body 331 is, for example, 1.5±0.001 mm.

The cylindrical seat portion 34 has a central portion in the radial direction thereof formed with a first communicative passage 341 that puts the conduit A1 in communication with the space 326 within the guide 32. The first communicative passage 341 is also formed with a restriction 341a whose cross-sectional area in the passage lengthwise direction decreases partway. A tapered first valve seat 342 that comes in contact with and separates from the valve body 331 of the shaft 33 is formed on an end portion of the space 326 side of the first communicative passage 341. A cone angle of the first valve seat 342 (a projection angle of the tip portion of a cone formed by the first valve seat 342) may be set to 113±1 to 2°, for example. In addition, the maximum diameter of the first valve seat 342 is set to 1.05 mm.

A second communicative passage 343 is also formed on the seat portion 34. The second communicative passage 343 is parallel to the first communicative passage 341 and puts the conduit A1 in communication with the space 326 within the guide 32. A tapered second valve seat 344 that comes in contact with and separates from the spherical check valve 31 is formed on an end portion of the conduit A1 side of the second communicative passage 343.

The check valve 31 is held at a position facing the second valve seat 344 by a filter 35 that is press-fit to an end portion side of the seat insertion hole 325 of the guide 32. In addition, a filter 36 is also disposed on an outer periphery of the major diameter portion 321 of the guide 32 so as to surround the communicative hole 327. The filters 35, 36 prevent foreign substances mixed in with the brake fluid from entering the pressure increase control valve 3.

A distal end of the minor diameter portion 322 of the guide 32 acts as a flat attraction face 322a without concave portion. A sleeve 37 is fitted to an outer periphery side of the minor diameter portion 322 so as to insert the attraction face 322a. The sleeve 37 is formed from a nonmagnetic metal (e.g. stainless steel). An end of the sleeve 37 has an open cup shape, and a cup bottom face thereof has a generally spherical shape.

A generally cylindrical plunger 38 made from a magnetic body is disposed on the bottom face side of the sleeve 37, with the plunger 38 able to slide within the sleeve 37. It should be noted that the plunger 38 is designed to contact the bottom face of the sleeve 37. When the plunger 38 contacts the bottom face of the sleeve 37, sliding of the plunger 38 in the upward direction in FIG. 2 is stopped.

The shaft 33 is biased toward the plunger 38 side by a spring 39 that is disposed between the shaft 33 and the seat portion 34. The shaft 33 and the plunger 38 are in constant contact with each other and integrally operate. Note that the shaft 33 and the plunger 38 form a movable core that moves depending on energization of a coil described later.

In the vicinity of the sleeve 37, a cylindrical spool 41 is disposed that accommodates a coil 40. The coil 40 forms a magnetic field during energization. To form the spool 41 made from resin (e.g. nylon), the spool 41 undergoes a primary molding and is subsequently attached to the coil 40, after which a secondary molding is performed.

A terminal 42 extends from the coil 40, and current flow from an external source to the coil 40 can be allowed via the terminal 42.

In addition, a yoke 43 made from a magnetic body is disposed on an outer periphery of the spool 41. The yoke 43 is generally cup-shaped, and has an outer-side cylindrical portion 431, a flange portion 432, and an inner-side cylindrical portion 433. The flange portion 432 extends from an end portion of the outer-side cylindrical portion 431 on a side opposite the housing 7 toward an inner radial side; and the inner-side cylindrical portion 433 extends in the axial direction from an inner peripheral portion of the flange portion 432 toward the housing 7 side. Furthermore, an opening portion on the housing 7 side of the outer-side cylindrical portion 431 is capable of accommodating the spool 41, the sleeve 37, etc.

A ring member 44 made from a magnetic body is press-fit to an inner peripheral face of the opening portion on the housing 7 side of the outer-side cylindrical portion 431. Also, the ring member 44 is disposed so as to surround the major diameter portion 321 of the guide 32.

The spool 41 is fitted to the yoke 43. In addition, the spool 41, the yoke 43, and the ring member 44 are fitted to the guide 32 and the sleeve 37. Note that the coil 40, the spool 41, the yoke 43, and the ring member 44 form a coil portion.

In order to achieve the relationships between the electromagnetic force (the attraction force) and fluid force+spring force, i.e., the resistance force, as described above in a pressure increase control valve 3 with the above basic structure, dimensions and the like of respective portions forming the pressure increase control valve 3 are defined. A description of these restrictions follows below.

Figure 3A:
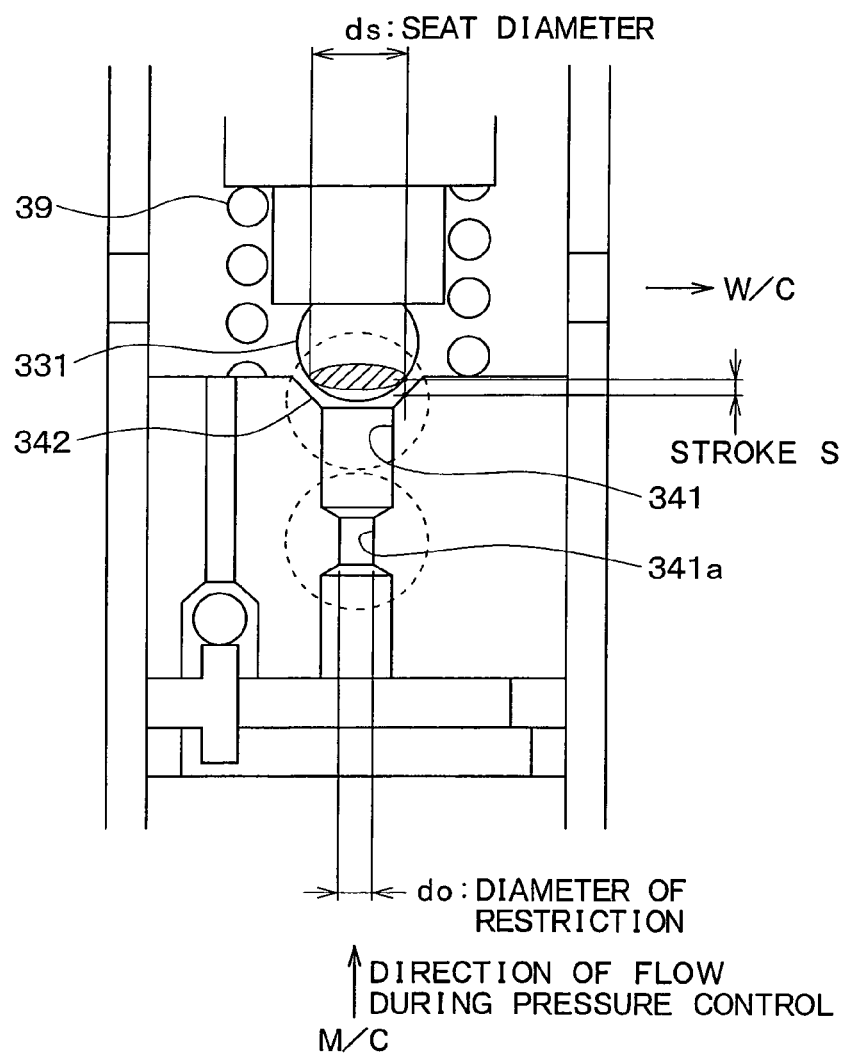
FIG. 3A is an enlarged view around a valve body in the pressure increase control valve shown in FIG. 2.
Figure 3B:
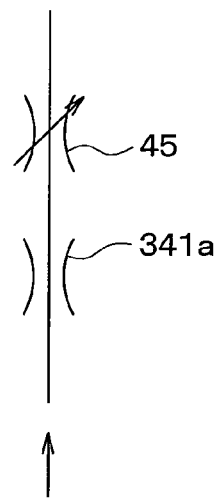
FIG. 3B is a circuit pattern diagram of a space that passes through a clearance between the valve body and a first valve seat via a first communicative passage in a seat.

FIG. 3A is an enlarged view around the valve body 331 in the pressure increase control valve 3 shown in FIG. 2, and FIG. 3B is a circuit pattern diagram of a portion that passes through a clearance between the valve body 331 and the first valve seat 342 via the first communicative passage 341 in the seat portion 34. Note that, normally, there should be hatching in FIG. 3A to indicate that it is a cross-sectional view. However, such hatching has been omitted from FIG. 3A for easier understanding.

As shown in FIG. 3A, a restriction 341*a* is formed in the first communicative passage 341. A cross-sectional area of the restriction 341*a* is constant, and thus the restriction 341*a* functions as a fixed aperture. Meanwhile, a clearance between the valve body 331 and the first valve seat 342 also acts as a restriction 45 as FIG. 3B shows. The restriction 45 functions as a variable aperture because a cross section between the valve body 331 and the first valve seat 342 varies depending on a stroke S, which is defined as the distance the valve body 331 has moved from a state of contact with the first valve seat 342. Accordingly, as FIG. 3B shows, the restriction 341*a* functioning as a fixed aperture and the restriction 45 functioning as a variable aperture, and which is structured by the clearance between the valve body 331 and the first valve seat 342, are aligned in series.

In the case with such configuration, a force applied to the valve body 331 by fluid flowing from the first communicative passage 341 via the conduit A1, i.e., a fluid force, is determined by the following: the degree of the total reduction effect from both restrictions 341*a*, 45; and the degree of the reduction effect from the restriction 45 with respect to the total reduction effect.

First, when the stroke S of the valve body 331 is zero, the fluid force is constant because the pressure of fluid within the conduit A1 is applied unchanged to the valve body 331, regardless of the total reduction effect from both restrictions 341*a*, 45. However, the stroke S of the valve body 331 can be varied to vary the magnitude of the reduction effect from the restriction 45. Consequently, the variation in the fluid force differs depending on the degree of the reduction effect from the restriction 45 with respect to the total reduction effect from both restrictions 341*a*, 45.

The magnitude of such fluid force is greatest when the restriction 45 structured by the clearance between the valve body 331 and the first valve seat 342 is narrow (when the reduction effect is large). In other words, the magnitude of such fluid force is greatest when the stroke S of the valve body 331 is zero. Meanwhile, the magnitude of such fluid force becomes smaller as the restriction 45 becomes wider (as the reduction effect becomes smaller). In other words, the magnitude of such fluid force becomes smaller as the stroke S of the valve body 331 becomes greater.

The fluid force acts on an inner side of a portion among the valve body 331 in contact with the first valve seat 342. The portion of the valve body 331 in contact with the first valve seat 342 is circular (see the hatched area in FIG. 3A), and a diameter of this portion is defined as a seat diameter ds. Accordingly, the basic fluid force acting on the valve body 331 can be determined based on the relationship between a diameter do of the restriction 341*a* and the seat diameter ds.

Figure 4:
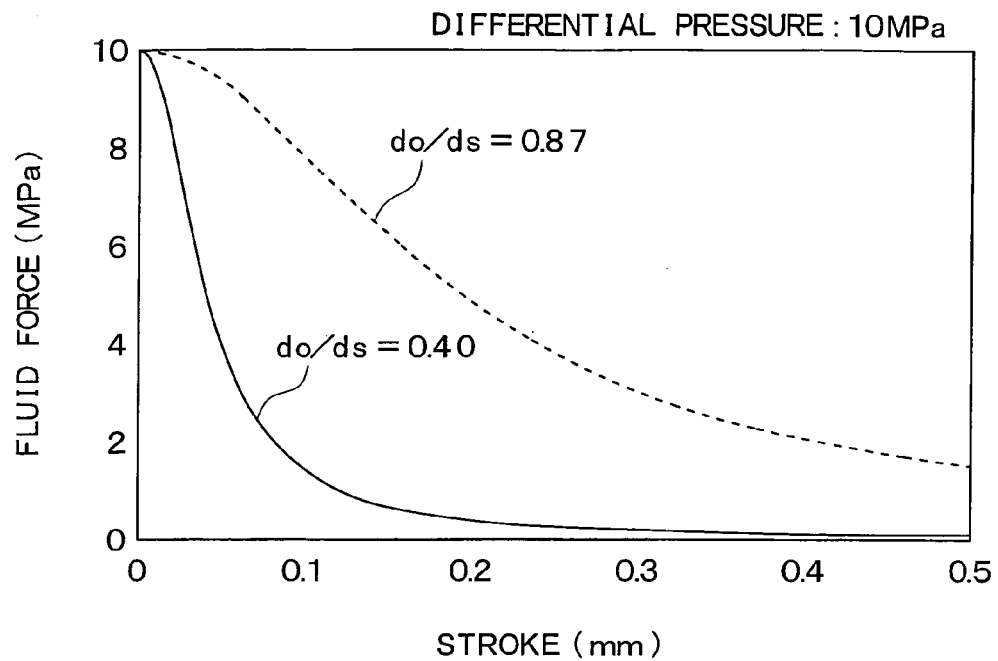
FIG. 4 is a graph showing the results of a simulation analysis of changes in a fluid force with respect to a stroke S of the valve body.

Variations in the fluid force with respect to the stroke S of the valve body 331 while varying the ratio (do/ds) between the diameter do of the restriction 341*a* and the seat diameter ds were simulated and analyzed. The results obtained are shown in FIG. 4. Cases where the above ratio (do/ds) is 0.87 and 0.40 are shown in the figure as examples. As evident from the figure, the variation in the fluid force in accordance with the stroke S of the valve body 331 differs depending on the magnitude of the ratio (do/ds). More specifically, the results show that the variation in the fluid force with respect to the stroke S becomes smaller as the ratio (do/ds) becomes larger, and the variation in the fluid force with respect to the stroke S becomes larger as the ratio (do/ds) becomes smaller.

Test studies on variations in the fluid force with respect to the stroke S of the valve body 331 while varying the ratio (do/ds) between the diameter do of the restriction 341*a* and the seat diameter ds obtained the same results as the above simulation analysis.

With regards to the maximum diameter of the first valve seat 342, note that the ratio of the maximum diameter of the first valve seat 342 with respect to the seat diameter ds is 1.3 or less. This has the effect of mitigating the action of the fluid force on the valve body 331.

Figure 5:
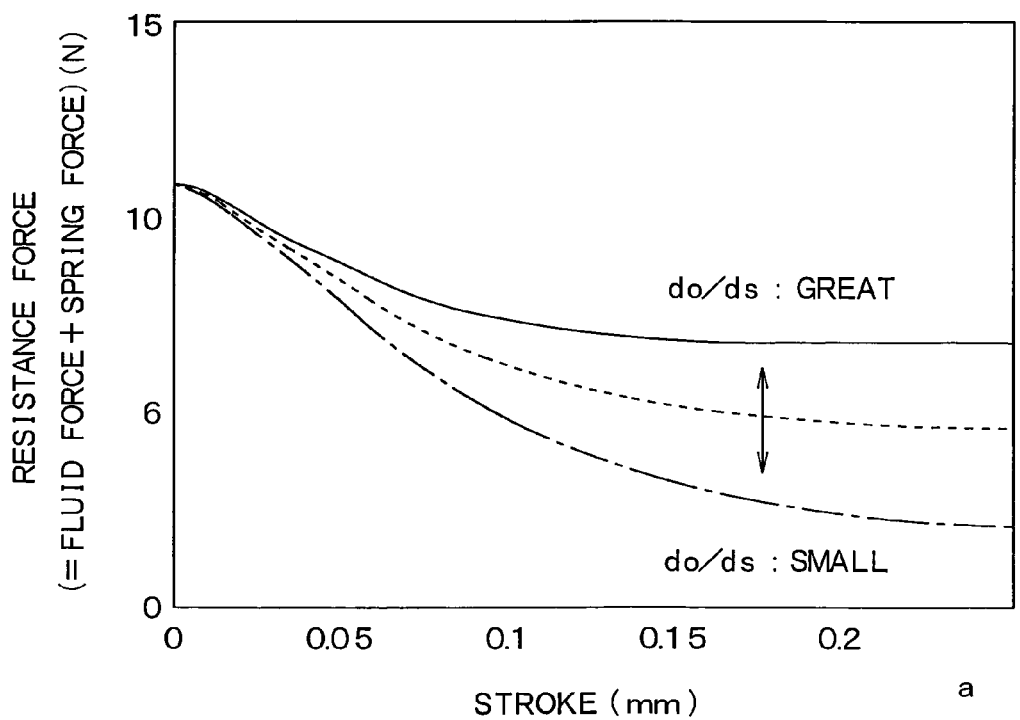
FIG. 5 is a graph showing changes in a resistance force in accordance with the stroke S of the valve body.

Thus, with regards to a resistance force corresponding to fluid force+spring force as shown in FIG. 5 for example, results show that variations in the fluid force with respect to the stroke S become smaller as the ratio (do/ds) increases, and variations in the fluid force with respect to the stroke S become greater as the ratio (do/ds) decreases.

Meanwhile, the electromagnetic force (the attraction force) varies depending on the energization amount of the coil 40, and the magnitude of a gap G, which is a clearance between the plunger 38 forming the movable core and the guide 32 forming the core shown in FIG. 2. A study of the variations in the electromagnetic force obtained the results shown in FIG. 6.

The electromagnetic force varies in direct proportion to the energization amount of the coil 40; the electromagnetic force increases in accordance with increases in the energization amount. Basically, the electromagnetic force gradually decreases as the size of the gap G between the plunger 38 and the guide 32 increases. However, as the figure shows, the electromagnetic force increases moderately when the size of the gap G between the plunger 38 and the guide 32 is a certain value or greater, but sharply increases when the size of the gap G is less than that certain value.

The relationship described above must be achieved in order to enable linear control of a differential pressure amount generated between the upstream and downstream flows of the pressure increase control valve 3. That is, using a balance point where the electromagnetic force and fluid force+spring force are equal as a reference position, the electromagnetic force must be greater than fluid force+spring force so as to draw the valve body back toward the valve seat side when the valve body moves in a direction away from the valve seat (in a direction that opens the valve). Alternatively, fluid force+ spring force must be greater than the electromagnetic force so as to draw the valve body away from the valve seat when the valve body moves in a direction approaching the valve seat (in a direction that closes the valve).

Figure 9:
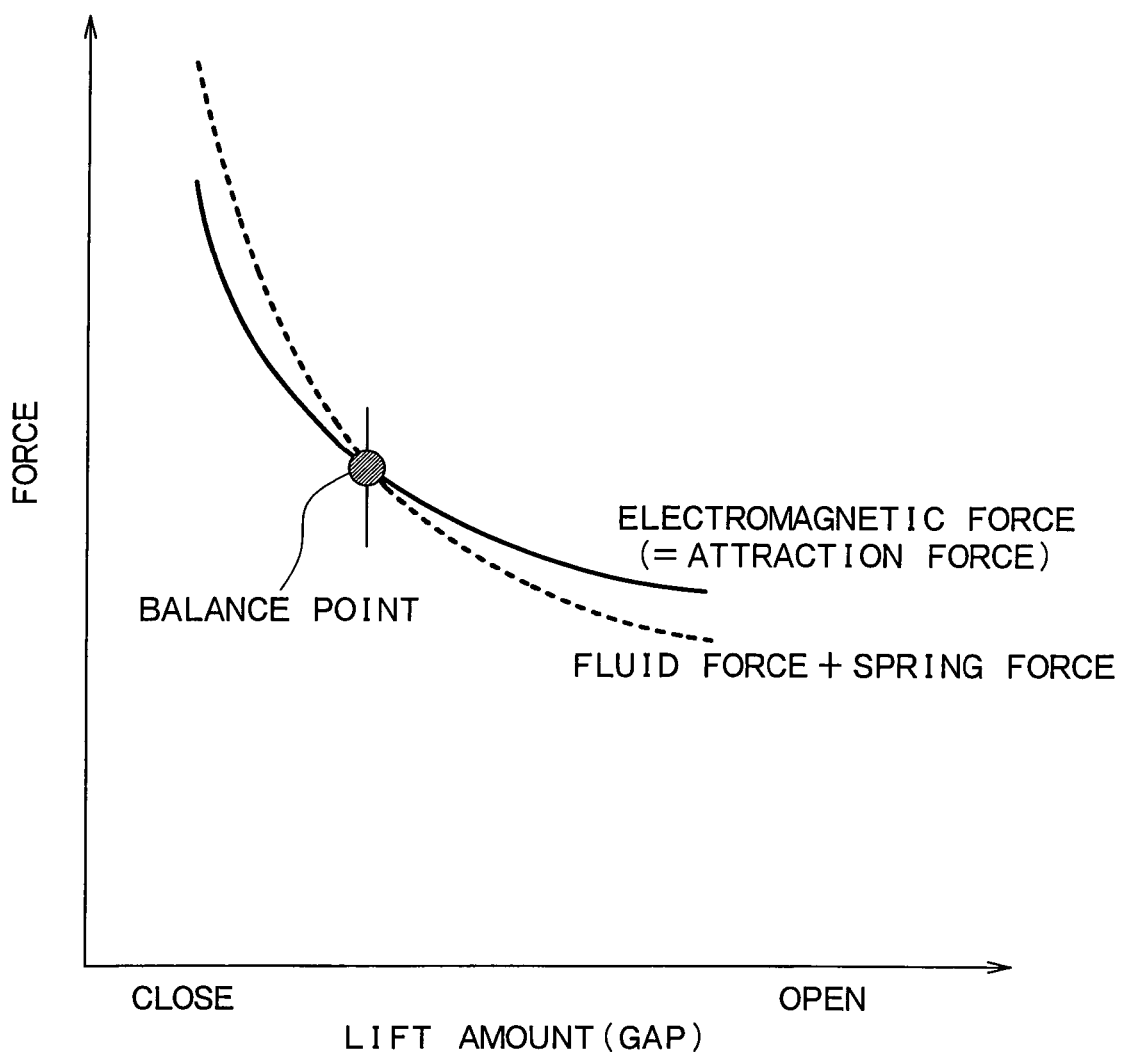
FIG. 9 is a characteristic diagram showing a relationship between the electromagnetic force and fluid force+spring force.
Figure 10A:
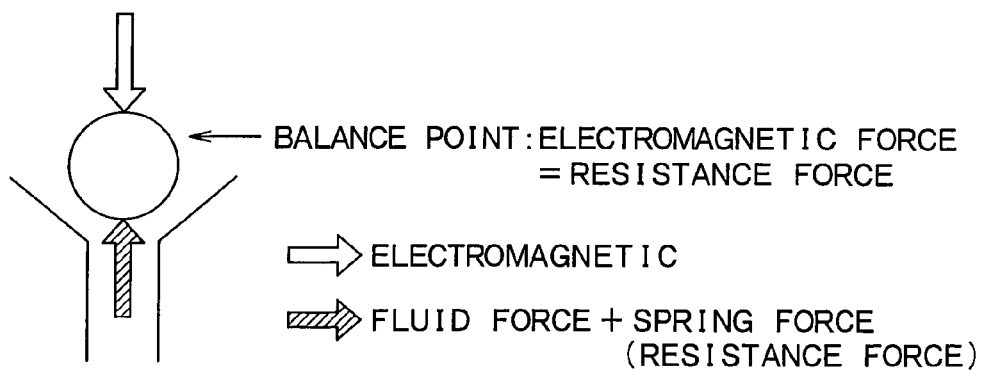
FIGS. 10A to 10C are pattern diagrams showing actions of a valve body in order to explain the relationship in FIG. 9.
Figure 10B:
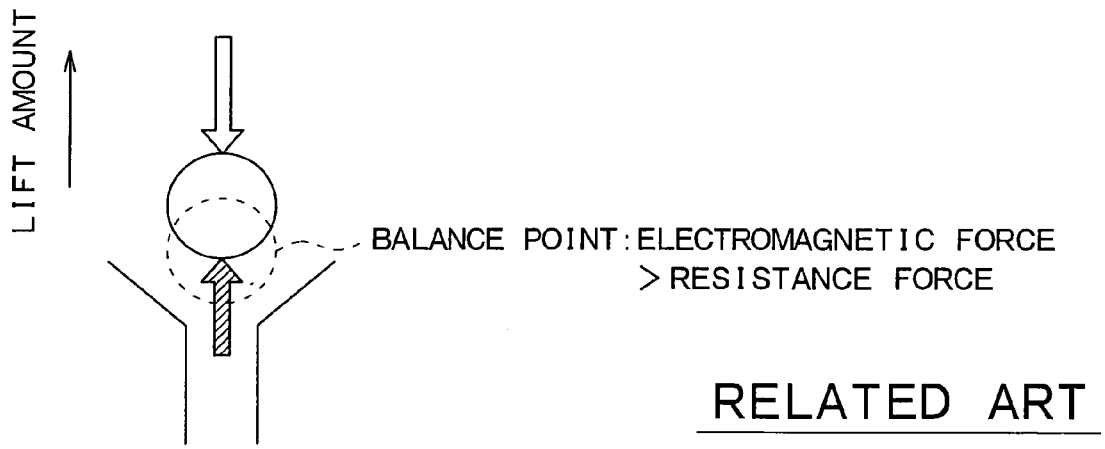
Figure 10C:
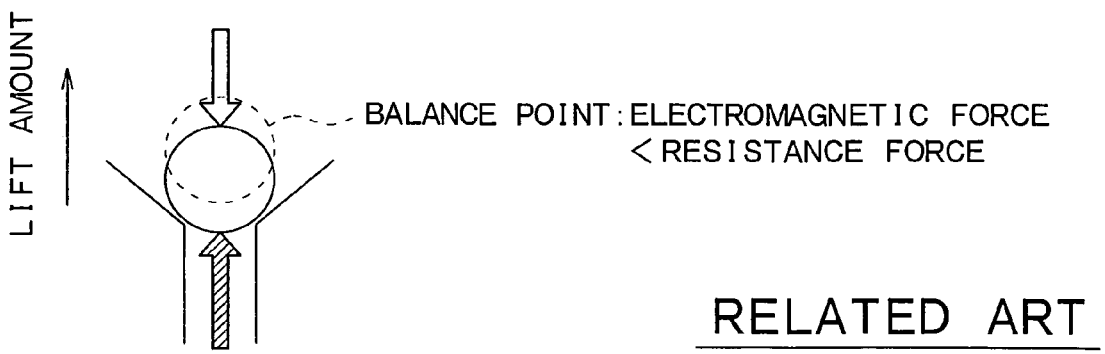

In order to achieve this, a relationship may be attained where the change in the resistance force (fluid force+spring force) becomes sharper than the change in the electromagnetic force over a period when the stroke S of the valve body 331 is zero up to a maximum value. Namely, a relationship as illustrated in FIG. 9 may be attained.

Figure 6:
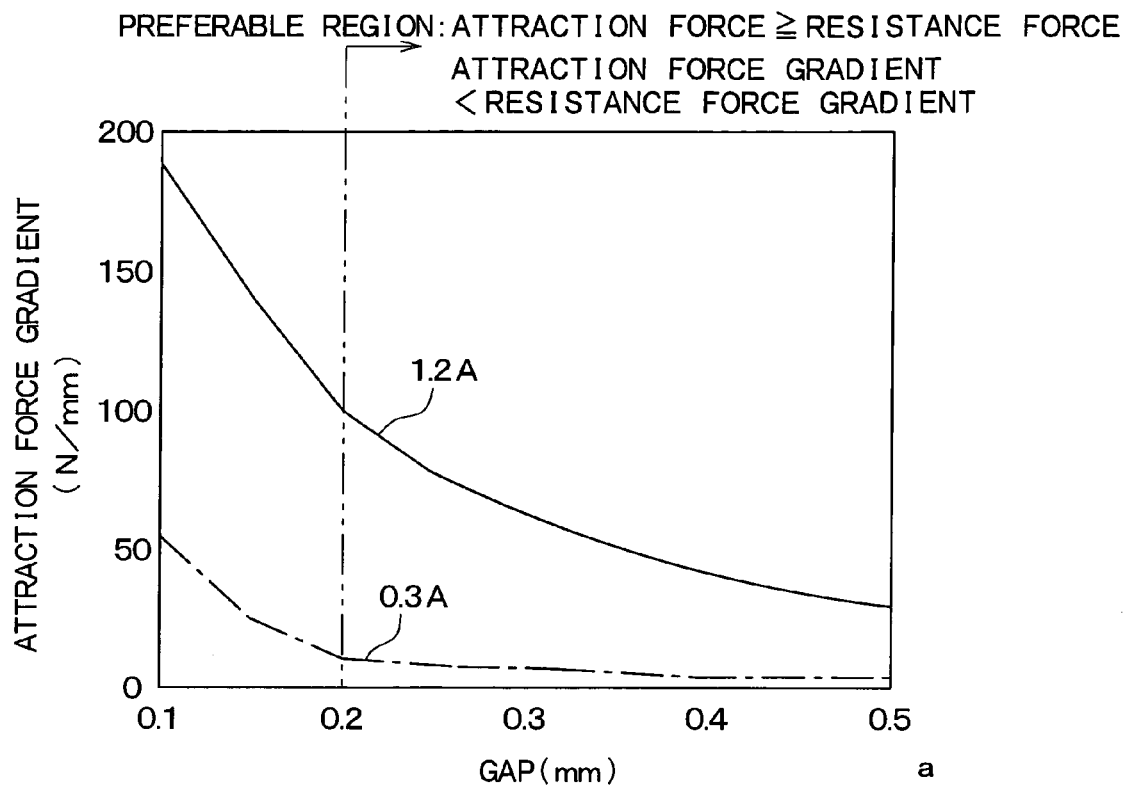
FIG. 6 is a graph showing changes in an electromagnetic force in accordance with an energization amount of a coil.

Assuming the above, dimensions and the like for respective portions of the pressure increase control valve 3 are determined so as to attain a relationship between the electromagnetic force shown in FIG. 6 and the fluid force and spring force (i.e., the resistance force) shown in FIG. 4, wherein the change in the resistance force (fluid force+spring force) becomes sharper than the change in the electromagnetic force over a period when the stroke S of the valve body 331 is zero up to a maximum value.

More specifically, in order to increase the variation in the fluid force with respect to the stroke S of the valve body 331, the ratio (do/ds) between the diameter do of the restriction 341a and the seat diameter ds may preferably be set to 0.9 or less. For example, if the seat diameter ds is 0.833 mm, then the diameter do of the restriction 341a may preferably be set to 0.30 to 0.75 mm. To ensure the workability of the hole diameter of the restriction, the lower limit of the ratio between the diameter do of the restriction 341a and the seat diameter ds may preferably be set to 0.36.

Alternatively, in order to decrease the variation in the electromagnetic force with respect to the stroke S of the valve body 331, the electromagnetic force may be set to a range other than that where the electromagnetic force sharply increases. That is, the size of the gap G between the plunger 38 and the guide 32 may be set to a certain value or greater. More specifically, the gap G should be set to 0.2 mm or greater, as evident in FIG. 6.

Note that with regards to a spring constant, there is no restriction on the spring constant in a case where the resistance force is greater than the electromagnetic force when the stroke S of the valve body 331 is small. However, since the fluid force decreases when the stroke S increases, the effect of the spring force also increases in such case. Taking this into consideration, the spring constant may be set to 3 N/mm or greater.

Figure 7:
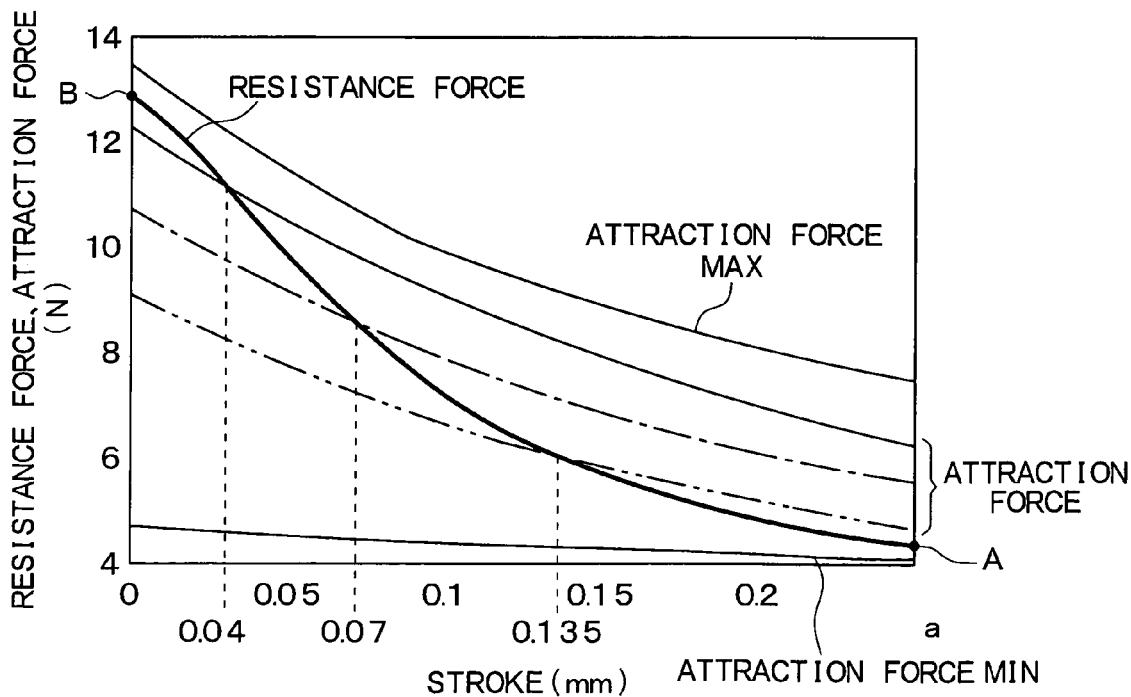
FIG. 7 is a graph showing the results of studying a relationship between the electromagnetic force and the resistance force when the electromagnetic force (an attraction force) is changed in the pressure increase control valve of the first embodiment.

FIG. 7 is a graph showing the results of studying a relationship between the electromagnetic force and the resistance force when the electromagnetic force (the attraction force) is changed in cases where the dimensions and the like of the respective portions of the pressure increase control valve 3 have attained the relationships described above. As the graph shows, varying the electromagnetic force changes the position of the balance point between the electromagnetic force and the resistance force.

Using the respective balance points resulting from varying the electromagnetic force as a reference, FIG. 7 clearly shows a relationship where the electromagnetic force is greater than the resistance force when the valve body 331 is moves farther away from the balance point than the valve seat 342 (in a direction that opens the valve). Alternatively, the resistance force is greater than the electromagnetic force when the valve body 331 moves in a direction approaching the valve seat 342 (in a direction that closes the valve).

To be more specific, the gradient of a stroke-attraction force characteristic line over a range where the stroke S of the valve body 331 is zero up to a MAX value is gentler than a stroke-resistance force characteristic line. In addition, the stroke-attraction force characteristic line moves up and down in accordance with the electromagnetic force applied.

An attraction force at maximum value of the stroke in the stroke-attraction force characteristic line for electromagnetic force MIN is smaller than a resistance force MIN point A (stroke=MAX) of the stroke-resistance force characteristic line. Meanwhile, an attraction force at zero value of the stroke in the stroke-attraction force characteristic line for electromagnetic force MAX is greater than a resistance force MAX point B (stroke=0) of the stroke-resistance force characteristic line.

As the electromagnetic force changes from MIN to MAX, the stroke-attraction force characteristic line is depicted as increasing toward the left such that the left-hand side of the figure further increases.

When the electromagnetic force applied to the electromagnetic valve is gradually decreased from electromagnetic force MAX, the stroke-resistance force characteristic line second from the top intersects with the stroke-attraction force characteristic line. These balance each other at a point where the stroke S=0.04 to stabilize the valve body 331, whereby a predetermined differential pressure can be obtained.

When the electromagnetic force is decreased, the stroke-resistance force characteristic line third from the top intersects with the stroke-attraction force characteristic line. These balance each other at a point where the stroke S=0.07 to stabilize the valve body 331, whereby a predetermined differential pressure can be obtained.

When the electromagnetic force is further decreased, the stroke-resistance force characteristic line fourth from the top intersects with the stroke-attraction force characteristic line. These balance each other at a point where the stroke S=0.135 to stabilize the valve body 331, whereby a predetermined differential pressure can be obtained.

When the electromagnetic force is decreased to zero, the shaft 33 and the plunger 38 move to the stroke MAX point. The shaft 33 and the plunger 38 remain unbalanced, and are biased toward and stop at the bottom face of the sleeve 37.

Thus, the pressure increase control valve 3 structured as described above enables linear control of the differential pressure generated between the upstream and downstream flows of the pressure increase control valve 3 to be possible.

Figure 8:
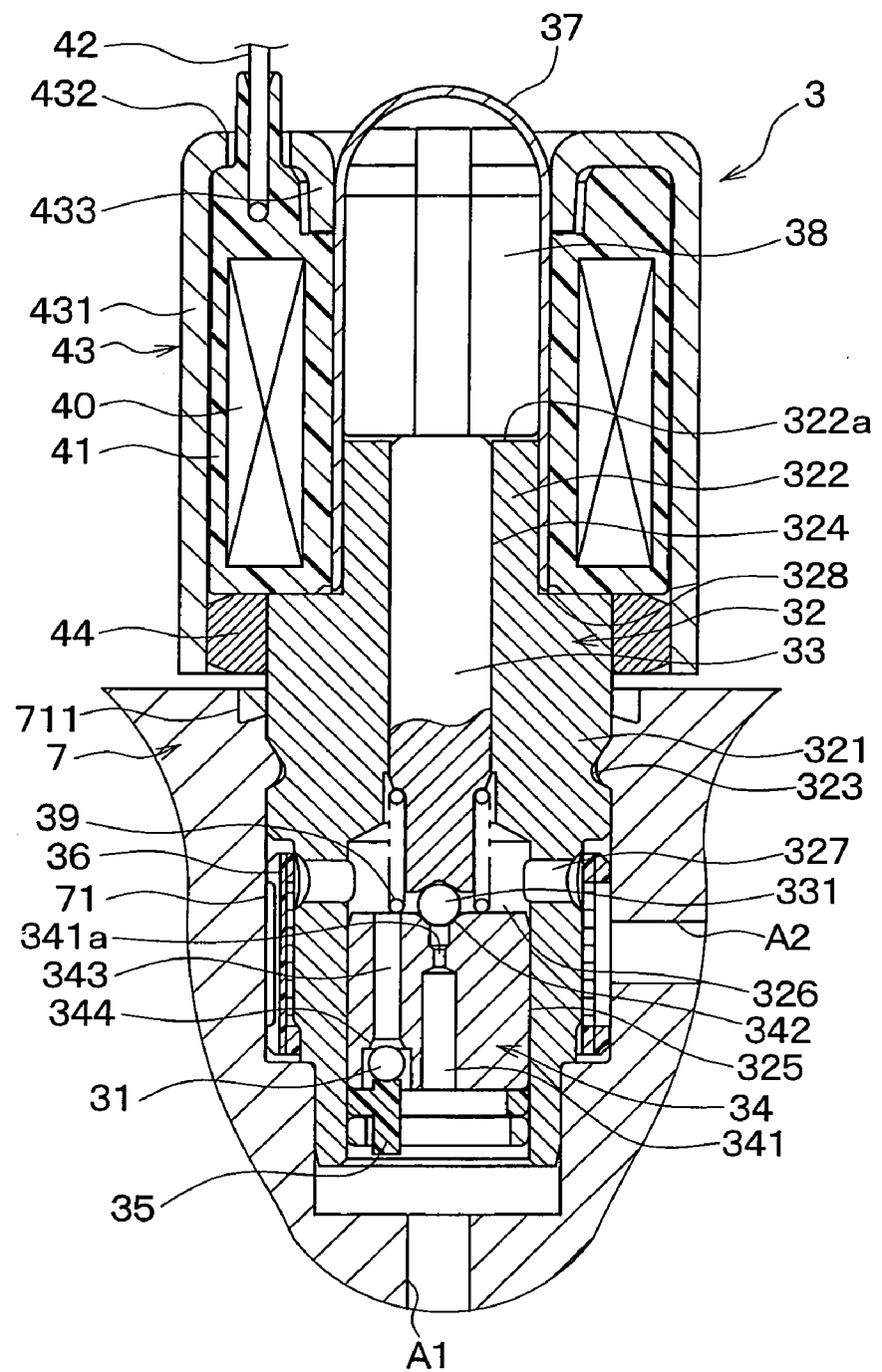
FIG. 8 is a cross-sectional view of a state where the pressure increase control valve is closed by coil energization.

Next, the operation of the pressure increase control valve 3 will be explained based on FIGS. 1, 2 and 8. FIG. 2 shows an operation state of the pressure increase control valve 3 during normal braking, that is, during no coil energization. Also, FIG. 8 shows a state where the pressure increase control valve 3 is closed by coil energization.

When the coil is not energized, the shaft 33 and the plunger 38 are biased toward the bottom face side of the sleeve 37 by the spring 39. The plunger 38 is in contact with the bottom face of the sleeve 37. The valve body 331 of the shaft 33 becomes separated from the first valve seat 342 of the seat portion 34. A communicative state is attained between the conduits A1, A2 via the first communicative passage 341 of the seat portion 34, the space 326 within the guide 32, and the communicative hole 327 of the guide 32.

Accordingly, brake fluid flows between the M/C 1 and the W/C 2 in accordance with operation of a brake pedal during normal braking.

Meanwhile, the coil 40 is energized at timings to decrease or hold pressure during ABS control, that is, when the pressure increase control valve 3 is closed. During being energized, the coil 40 forms a magnetic field, and a magnetic path is formed by the guide 32, the plunger 38, the yoke 43, and the ring member 44. The plunger 38 is attracted to the guide 32 side by the electromagnetic force (the attraction force). The shaft 33 and the plunger 38 are moved toward the seat portion 34 side against the spring 39, and the valve body 331 of the shaft 33 comes in contact with the first valve seat 342 of the seat portion 34. Accordingly, the pressure increase control valve 3 closes, and the flow of brake fluid from the conduit A1 to the conduit A2 is cut off.

Note that when the electromagnetic valve is in as closed state as described above, a clearance of 0.2 mm or greater remains between opposing faces of the plunger 38 and the guide 32, regardless of whether the plunger 38 has moved as far as possible toward the guide 32 side.

At the timing to increase pressure during ABS control, the energization amount of the coil 40 is controlled for linear control of the differential pressure amount generated between the upstream and downstream flows of the pressure increase control valve 3. Thus, the W/C pressure is controlled according to the energization amount of the coil 40.

In this case, the dimensions and the like of the respective portions of the pressure increase control valve 3 are controlled as described above, and therefore, the valve body 331 can return to the original balanced position and the differential pressure amount between the upstream and downstream flows of the pressure increase control valve 3 can be reliably maintained. This is true regardless of imbalances between the electromagnetic force and the resistance force (i.e., fluid force+spring force), which may be caused by any external disturbances, such as fluctuations in the fluid force or vehicle vibration.

During timings to decrease or hold pressure during ABS control, that is, when the pressure increase control valve 3 is closed, the differential pressure between the M/C 1 side and the W/C 2 side causes the check valve 31 to separate from the second valve seat 344 of the seat portion 34 if depression of the brake pedal is cancelled. In addition, a communicative state is attained between the conduits A1, A2 via the second communicative passage 343 of the seat portion 34, the space 326 within the guide 32, and the communicative hole 327 of the guide 32. Accordingly, brake fluid flows from the W/C 2 side toward the M/C 1 side.

As explained above, according to the brake apparatus in the present embodiment, linear control of the differential pressure generated between the upstream and downstream flows of the pressure increase control valve 3 is achieved based on the dimensions and the like of the respective portions of the pressure increase control valve 3. Furthermore, the valve body 331 is formed into a sphere, which is an extremely easy shape to manufacture. The attraction face 322a of the guide 32 is also formed flat without concave portion that are difficult to machine.

Therefore, the pressure increase control valve 3 can be formed using an electromagnetic valve with a structure that does not require complicated machining for linear control of a differential pressure amount generated between upstream and downstream flows.

Other Embodiments

In the first embodiment, an example of the pressure increase control valve 3 was described in which the size of the gap G between the plunger 38 and the guide 32 is 0.2 mm or greater, and the ratio (do/ds) between the diameter do of the restriction 341a and the seat diameter ds is 0.9 or less. However, employing at least one of the above dimensions can help simplify the construction of an electromagnetic valve capable of linear control of the differential pressure amount generated between the upstream and downstream flows as described above.

This is because setting the size of the gap G between the plunger 38 and the guide 32 to 0.2 mm or greater can decrease variations in the electromagnetic force with respect to the stroke S of the valve body 331. Therefore, it is easier to achieve a relationship between the electromagnetic force and the resistance force that is required in order to enable linear control of the differential pressure amount generated between the upstream and downstream flows.

In addition, setting the ratio (do/ds) between the diameter do of the restriction 341a and the seat diameter ds to 0.9 or less can increase variations in the fluid force with respect to the stroke S of the valve body 331. Thus, the same effect as mentioned above can be achieved.

In the first embodiment, the pressure increase control valve 3 was described as an example of an electromagnetic valve capable of linear control of the differential pressure amount generated between the upstream and downstream flows. However, the same effects can also be obtained when the same construction is employed for the pressure decreasing control valve 5.

While the above description is of the preferred embodiments of the present invention, it should be appreciated that the invention may be modified, altered, or varied without deviating from the scope and fair meaning of the following claims.

What is claimed is:

1. A linear-controlled electromagnetic valve for brake control having
   a sleeve including a cylindrical portion and a bottom face, and which is formed into a cup shape having an end side that is an opening portion;
   a coil provided on an outer periphery of the sleeve;
   a plunger, which is accommodated within the sleeve, for sliding along inner side surface of the sleeve by energization of the coil;
   a shaft provided with a spherical valve body, for moving in accordance with the sliding of the plunger;
   a guide formed from a magnetic body and provided with a guide hole, which hold the shaft, and keeps its sliding and an attraction face that faces an end face of the plunger, the guide formed such that the attraction face is inserted in the sleeve; and
   a seat portion including a valve seat, which the valve body comes in contact with and separates from, and a communicative passage that opens and closes based on the contact and separation of the valve body with respect to the valve seat, wherein an attraction force in accordance with the energization current to the plunger makes the valve body come in contact with the valve seat, a resistance force in the opposite direction of the attraction force to the shaft makes the valve body separate the valve seat, by the attraction force and the resistance force, the valve body moves over a range where a stroke of the valve body from the valve seat is zero up to a maximum value, a gap of 0.2 mm or greater is left between the end face of the plunger and the attraction face of the guide when the valve body comes in contact with the valve seat, over a range where a stroke of the valve body from the valve seat is zero up to a maximum value, a stroke-attraction force characteristic line, which rises in accordance with a rise of electromagnetic force quantity, has a gentler gradient than a stroke-resistance force characteristic line, an attraction force at maximum value of the stroke in the stroke-attraction force characteristic line at a minimum value of electromagnetic force is smaller than a resistance force minimum point of the stroke-resistance force characteristic line, and an attraction force at zero value of the stroke in the stroke-attraction force characteristic line at a maximum value of electromagnetic force is greater than a resistance force maximum point of the stroke-resistance force characteristic line.

2. The linear-controlled electromagnetic valve for brake control according to claim 1, further including:

a spring for biasing the valve body in a direction away from the valve seat, wherein a spring constant of the spring is 3 N/mm or greater.

3. A linear-controlled electromagnetic valve for brake control having a sleeve including a cylindrical portion and a bottom face, and which is formed into a cup shape having an end side that is an opening portion; a coil provided on an outer periphery of the sleeve;

a plunger, which is accommodated within the sleeve, for sliding along inner side surface of the sleeve by energization of the coil;

a shaft provided with a spherical valve body, for moving in accordance with the sliding of the plunger; a guide formed from a magnetic body and provided with a guide hole, which hold the shaft, and keeps its sliding and an attraction face that faces an end face of the plunger, the guide formed such that the attraction face is inserted in the sleeve; and a seat portion including a valve seat, which the valve body comes in contact with and separates from, and a communicative passage that opens and closes based on the contact and separation of the valve body with respect to the valve seat, wherein an attraction force in accordance with the energization current to the plunger makes the valve body come in contact with the valve seat, a resistance force in the opposite direction of the attraction force to the shaft makes the valve body separate the valve seat, by the attraction force and the resistance force, the valve body moves over a range where a stroke of the valve body from the valve seat is zero up to a maximum value, the communicative passage of the seat is formed with a restriction whose passage cross-sectional area is smaller than other portions of the communicative passage, a ratio between a diameter of the restriction and a seat diameter is 0.9 or less, in a case where a circular diameter, which is formed by a contact portion between the valve body and the valve seat when the valve body comes in contact with the valve seat, is the seat diameter, over a range where a stroke of the valve body from the valve seat is zero up to a maximum value, a stroke-attraction force characteristic line, which rises in accordance with a rise of electromagnetic force quantity, has a gentler gradient than a stroke-resistance force characteristic line, an attraction force at maximum value of the stroke in the stroke-attraction force characteristic line at a minimum value of electromagnetic force is smaller than a resistance force minimum point of the stroke-resistance force characteristic line, and an attraction force at zero value of the stroke in the stroke-attraction force characteristic line at a maximum value of electromagnetic force is greater than a resistance force maximum point of the stroke-resistance force characteristic line.

4. The linear-controlled electromagnetic valve for brake control according to claim 3, wherein the valve seat is formed by tapering an end portion on the plunger side of the communicative passage formed in the seat, and a ratio of a maximum diameter of the valve seat with respect to the seat diameter is 1.3 or less.

5. The linear-controlled electromagnetic valve for brake control according to claim 3, wherein a gap of 0.2 mm or greater is left between the end face of the plunger and the attraction face of the guide when the valve body comes in contact with the valve seat.

* * * * *